United States Patent [19]

Reppert et al.

[11] Patent Number: 4,462,274
[45] Date of Patent: Jul. 31, 1984

[54] SHIFTABLE PLANETARY GEAR TRAIN

[75] Inventors: Rudi Reppert, Füssen; Franz X. Zaunberger, Augsburg, both of Fed. Rep. of Germany

[73] Assignee: Zahnraderfabrik Renk A.G., Augsburg, Fed. Rep. of Germany

[21] Appl. No.: 400,279

[22] Filed: Jul. 21, 1982

[30] Foreign Application Priority Data

Jul. 31, 1981 [DE] Fed. Rep. of Germany ....... 3130260

[51] Int. Cl.³ .................... F16H 57/10; F16H 3/44
[52] U.S. Cl. .................... 74/781 R; 74/801; 74/750 R
[58] Field of Search ............... 74/781 R, 782, 783, 74/801

[56] References Cited

U.S. PATENT DOCUMENTS

| 2,115,964 | 5/1938 | Osborne | 74/781 R |
| 2,155,476 | 4/1939 | Dooley | 74/781 R X |
| 2,215,671 | 9/1940 | Swennes | 74/781 R |
| 2,328,291 | 8/1943 | Osborne | 74/781 R |
| 2,548,761 | 4/1951 | Armantrout | 74/781 R |
| 2,933,944 | 4/1960 | Carnagua | 74/781 R X |
| 2,949,794 | 8/1960 | Boehm | 74/781 R X |
| 2,964,977 | 12/1960 | Kopec | 74/781 R |
| 3,477,314 | 11/1969 | Rutkowski | 74/750 R |
| 3,682,020 | 8/1972 | Scheiter | 74/781 R X |
| 3,855,878 | 12/1974 | Steiner | 74/665.1 X |
| 4,189,960 | 2/1980 | Holdeman | 74/781 R |
| 4,403,526 | 9/1983 | Numazawa et al. | 74/781 R X |

FOREIGN PATENT DOCUMENTS

| 1291215 | 3/1969 | Fed. Rep. of Germany . |
| 2059351 | 6/1971 | Fed. Rep. of Germany . |
| 2708524 | 1/1981 | Fed. Rep. of Germany ........ 74/694 |
| 1561541 | 2/1969 | France . |
| 1342765 | 1/1974 | United Kingdom . |

Primary Examiner—Leslie A. Braun
Assistant Examiner—Dwight G. Diehl
Attorney, Agent, or Firm—Natter & Natter

[57] ABSTRACT

A shiftable planetary gear train is driven by the output of a conventional vehicle transmission which engages a ring gear of the planetary gear train. The planetary gear train includes two shifting sleeves which are axially displaced as a unit. One of the sleeves is rotatably driven by the ring gear while the other sleeve is nonrotatable. In one shift position, the rotatable sleeve is brought into driving engagement with a planet carrier which drives an output shaft thereby fixing the output shaft relative to the ring gear. When the shifting sleeves are unitarily moved to a neutral position, the rotatable sleeve is disengaged from the planet carrier. Further displacement of the shifting sleeves results in locking the sun gear against rotation. This is accomplished by engagement between the nonrotatable sleeve and a spur gear which is fixed to an extension of the sun gear. Movement of the shifting sleeves is controlled through a fluid cylinder which is coupled to a shift fork, one arm of which engages a groove in one of the sleeves and the other arm of which engages a groove in the other sleeve. Detents are provided to seat the sleeves in the various shifting positions.

12 Claims, 3 Drawing Figures

SHIFTABLE PLANETARY GEAR TRAIN

TECHNICAL FIELD

This invention relates generally to shiftable gearings and more specifically to a shiftable planetary gear train.

BACKGROUND ART

The goal of reducing fuel consumption in vehicles has led to reductions in both engine size and vehicle weight. Attempts to maintain engine performance and load handling ability of various vehicle engines included apparatus for an increased number of available gear ratios between an engine and a vehicle drive shaft. The implementation of additional gear ratios in vehicle transmissions resulted in increased transmission costs and increased weight. Alternate approaches have suggested expansion of the number of gear ratios available in a conventional transmission with an additional gearing intermediate the main transmission and the drive shaft.

The present invention provides a shiftable planetary gear train intermediate a vehicle main transmission and a drive shaft. In German patent DE AS 2 708 524, a typical planetary gear train is described.

DISCLOSURE OF THE INVENTION

A shiftable planetary gear train includes a driven ring gear and a pair of shifting sleeves which are axially displaceable as a unit. One of the sleeves is rotatably driven by the ring gear. A second sleeve is nonrotatable.

The sleeves are simultaneously displaced through a shift fork having a pair of arms. One arm of the fork extends into a groove formed on the rotatable sleeve, while another arm of the fork extends into a groove on the nonrotatable sleeve.

With the sleeves in a neutral position, the rotatable sleeve is driven by the ring gear while the nonrotatable sleeve engages an annular gear formed in a stationary gear casing.

When the shift fork is moved toward the planet carrier to a first shift position, an annular gear formed in the rotatable sleeve engages a rim gear fixed to the planet carrier causing the planet carrier to be driven unitarily with the ring gear.

With the shift fork moved from the neutral position away from the planet carrier to a second shift position, an annular gear formed in the nonrotatable sleeve engages a spur gear fixed to an axial extension of a sun gear causing the sun gear to be blocked from further rotation.

With the shifting sleeves in the first shift position, a gear ratio of i=1:1 is provided. While in the second shift position with the sun gear blocked, a gear ratio of, for example, i=1:1.5 may be provided. The neutral position is not generally employed for driving the drive shaft but assures that meshing engagement will be achieved during a shift procedure.

From the foregoing compendium, it will be seen that it is a feature of the present invention to provide a shiftable planetary gear train of the general character described which is not subject to the disadvantages of the prior art aforementioned.

A further feature of the present invention is to provide a shiftable planetary gear train of the general character described which is suitable for use in a vehicle to provide additional gear shift ratios.

Another aspect of the present invention is to provide a shiftable planetary gear train of the general character described which is suitable for use in a vehicle between a vehicle transmission and a drive shaft.

Another feature of the present invention is to provide a shiftable planetary gear train of the general character described which is low in cost and suitable for mass production fabrication techniques.

A further feature of the present invention is to provide a shiftable planetary gear train of the general character described which is relatively light in weight and occupies but a modicum of space.

An additional feature of the present invention is to provide a shiftable planetary gear train of the general character described which precludes the simultaneous engagement of conflicting gear shift positions.

A still further aspect of the present invention is to provide a shiftable planetary gear train of the general character described which assures reliable shifting operation.

Other features and aspects of the present invention in part will be obvious and in part will be pointed out hereinafter.

With these ends in view, the invention finds embodiment in certain combinations of elements and arrangements of parts by which the objects aforementioned and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

BEST MODE FOR CARRYING OUT THE INVENTION

Figure 1:
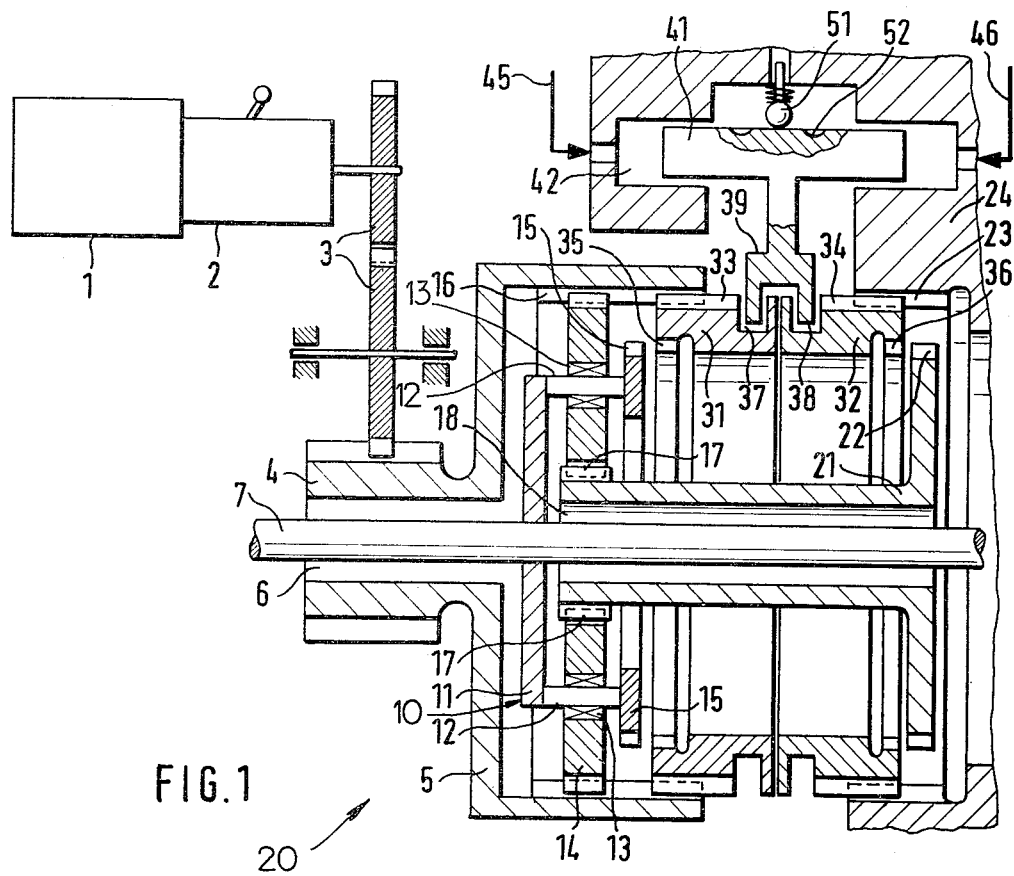
FIG. 1 is a fragmentary axial sectional view through a shiftable planetary gear train constructed in accordance with the present invention and in a neutral shift position and showing the planetary gear train being driven by an engine and gearing which are illustrated schematically.

Referring now in detail to the drawings, the reference numeral 20 denotes generally a shiftable planetary gear train constructed in accordance with and embodying the present invention. The gear train 20 is suitable for employment between a conventional vehicle transmission and a shaft which drives the vehicle wheels.

An engine 1 drives the planetary gear train 20 through a shiftable transmission 2 such as an automatic transmission and an intermediate gear train schematically illustrated as comprising a pair of spur gears 3 driven by the transmission 2. The intermediate gear train in turn engages a spur gear 4 projecting from the hub of and fixed to a ring gear 5. Power input to the planetary gear train 20 is thus provided to drive the ring gear 5.

As illustrated in FIG. 1, the ring gear 5 and the spur gear 4 may be of one piece construction and include an axial bore 6 through which an output shaft 7 extends. It should be appreciated that the output shaft 7 engages a vehicle drive shaft or alternate power train assemblies for driving the vehicle wheels.

In a conventional manner, the output shaft 7 is fixed to a planet gear carrier assembly 10 which includes a planar carrier plate 11 having a plurality of pins 12. The pins 12 project from the carrier plate 11 in a direction away from the spur gear 4. A journal bearing 13 interconnects each pin 12 with a planet gear 14. The teeth of each of the planet gears 14 are in constant meshing engagement with internal teeth 16 of the ring gear 5 and teeth 17 of a sun gear 18.

Pursuant to the present invention, the planet carrier assembly 10 is selectively caused to rotate unitarily with the sun gear 18 to thereby provide a 1:1 output ratio in a first shift position. For such purpose, it will be seen that the pins 12 which carry the planet gears 14 project a distance beyond the respective planet gears. Fixed to the ends of the pins 12 is a carrier assembly rim 15 having external spur teeth formed along its periphery. It should be appreciated that the rim 15 is rigidly connected with the carrier plate 11 through the pins 12 and rotates as part of the carrier assembly.

It will be observed that the sun gear 18 includes an elongate cylindrical hub 21 having a bore of sufficient diameter to permit the output shaft 7 to rotate freely therewithin. The hub 21 extends in a direction away from the carrier assembly 10 and includes an externally toothed spur gear 22 fixed at its distal end. As illustrated, the sun gear 18, the cylindrical hub 21 and the spur gear 22 may be formed of one piece construction. The spur gear 22 is of the same diameter as is the rim 15 of the planet carrier assembly.

The internal teeth 16 of the ring gear 5 extend beyond the axial position of the rim 15. Opposite the internal teeth 16 of the ring gear 5 is an identical annular gear 23 formed in a cylindrical area of a gear casing 24. The annular gear 23 of the gear casing 24 extends axially beyond the spur gear 22.

In accordance with the present invention, a pair of identical shifting sleeves 31, 32 are positioned in back to back relationship and are axially displaceable as a unit to provide various shift positions. The sleeve 31 includes spur gear teeth 33 which are in constant meshing engagement with the internal teeth 16 of the ring gear 5. Similarly, the sleeve 32 includes spur gear teeth 34 which are in constant meshed engagement with the annular gear 23 of the gear casing 24. Thus, the sleeve 32 is blocked from rotating since the gear casing 24 is stationary.

An outer portion of a bore running through each of the sleeves 31, 32 is provided with an annular gear 35, 36 respectively. It should be appreciated that when the sleeves move from the FIG. 1 neutral position into various shift positions, either the annular gear 35 will engage the carrier assembly rim 15 or the annular gear 36 will engage the spur gear 22. In the neutral position, the annular gears of the sleeves 31, 32 are not in engagement.

To move the sleeves 31, 32 into the various shift positions, a circumferential groove 37, 38 is provided in the sleeves 31, 32 respectively adjacent the juxtaposed ends of the sleeves. One arm of a shift fork 39 is engaged in each of the grooves 37, 38, and the shift fork is actuated by a control piston 41 which is seated in a cylinder 42.

The cylinder has an axis parallel to the axis of the shiftable planetary gear train 20 and suitable fluid pressure may be selectively applied to opposite ends of the cylinder 42 through a pair of control lines 45, 46. It is evident that the position of the piston 41 will determine the position of both of the shifting sleeves 31, 32. The shifting sleeves will move simultaneously since the arms of the shift fork 39 are engaged in each groove 37, 38. In order to provide a positive stop for the various positions of the shifting sleeves and to assure that the shift positions selected will be maintained in the event of a pressure failure over the control lines 45, 46, a suitable detaining device may be employed such as a spring loaded ball 51 which engages a plurality of sockets 52 formed in the piston 41.

Figure 2:
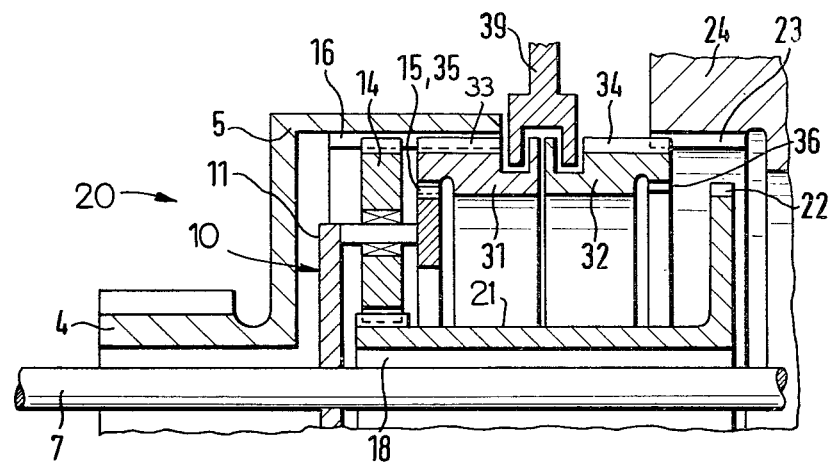
FIG. 2 is a fragmentary axial sectional view through the planetary gearing with portions deleted and illustrating the gearing in a first shift position wherein a planet carrier moves unitarily with a ring gear.

Turning now to FIG. 2 wherein the shifting sleeves 31, 32 have been displaced from the neutral position of FIG. 1 toward the left to a first shift position, it will be seen that the spur gear teeth 33, 34 of the sleeves 31, 32 remain in engagement with the respective internal teeth 16 and annular gear 23. Thus, the sleeve 31 will continue to rotate with the ring gear 5 and the sleeve 32 will be held fast against rotation. The annular gear 35 of the rotating sleeve 31 is now in engagement with the spur gear teeth of the carrier assembly rim 15. As a result, the planet carrier assembly 10 and the output shaft 7 do not rotate relative to the ring gear 5. The resulting gear transmission ratio of the shiftable planetary gear train 20 between the input spur gear 4 of the ring gear 5 and the output shaft 7 equals 1:1.

Force transmission from the input at the spur gear 4 extends through the ring gear 5, via the shifting sleeve 31 directly to the carrier assembly 10; the planet gears 14, as well as their journal bearings 13, are not under load. As previously stated, the shifting sleeve 32 is continued to be blocked from rotation.

Figure 3:
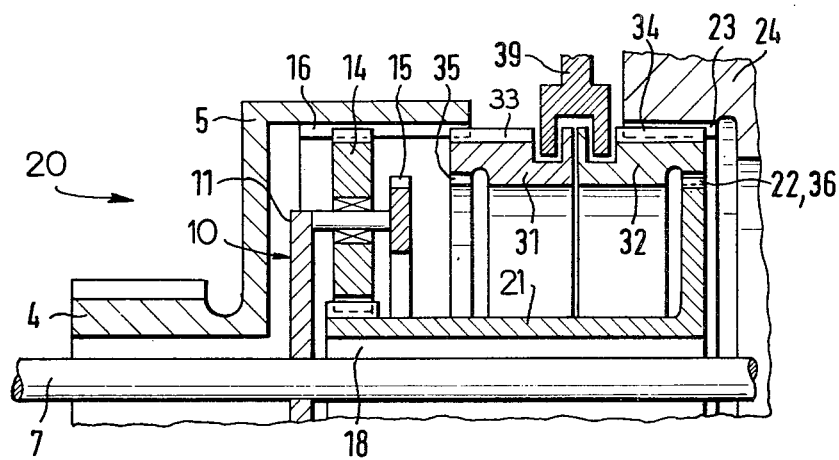
FIG. 3 is a further fragmentary axial sectional view through the shiftable planetary gear train wherein the shiftable planetary gear is shown in a second shift position wherein a sun gear is blocked from rotating to provide a stepped up gear ratio.

A second shift position of the shiftable planetary gear train 20 is illustrated in FIG. 3 which indicates the external spur gear teeth 33, 34 of the sleeves 31, 32, respectively, maintained in engagement with their corresponding internally toothed gears 16 and annular gear 23. The annular gear 35 of the sleeve 31 is out of engagement with the rim 15 and the annular gear 36 of the sleeve 32 is now in engagement with the spur gear 22 thus blocking rotation of the sun gear 18.

The transition between the first shift position of FIG. 2 to the second shift position of FIG. 3 preferably proceeds with the vehicle engine 1 running, the main transmission 2 idle, and the vehicle or the output shaft 7 stationary. An electrical circuit may be provided to monitor the conditions precedent to a shifting operation.

The shift fork 39 is then moved toward the right into the neutral position shown in FIG. 1. When the shift fork is moved toward the right into the neutral position of FIG. 1, the shifting sleeve 31 disengages from the carrier assembly rim 15 but maintains its engagement with the internal teeth 16 of the ring gear 5. The shifting sleeve 32 maintains its engagement with the annular gear 23 of the gear casing 24 but is not yet in engagement with the spur gear 22.

The drag moment of the transmission 2 (which is in idle) drives the sun gear 18 through the ring gear 5 and the planet gears 14 while the output shaft 7 and the planet carrier assembly 10 do not rotate. The rotation of the sun gear 18 rotates the cylindrical hub 21 and the spur gear 22. Such rotation of the spur gear 22 eliminates possible tooth to tooth interference between the annular gear 36 of the sleeve 32 and the spur gear 22.

The shift fork continues to move toward the right to the second shift position of FIG. 3 and the sun wheel 18 is coupled to the sleeve 32 through the meshing engagement between the annular gear 36 and the spur gear 22. Thus, the sun gear 18 is blocked from rotation by being fixed relative to the gear casing 24. In the second shift position, the sleeve 31 remains in engagement with the ring gear 5 and continues to rotate with the ring gear.

The second shift position of FIG. 3 provides a planetary gear train transmission ratio of, for example, i1:1.5.

Shifting from the second shift position to the first shift position wherein the planetary gear train ratio is i=1:1 is effected in the reverse order.

Because the shift fork 39 always moves both shifting sleeves 31, 32 simultaneously as a single unit, improper shifting and simultaneous engagement of conflicting gear ratios is precluded.

It should be noted that the neutral shift position of FIG. 1 is not required for the purpose of interrupting the driving connection between the ring gear 5 and the carrier assembly 10 but is predominently for the purpose of permitting gear rotation to prevent tooth to tooth interference when engaging the annular gears of the sleeves. Further, the implementation of two shifting sleeves facilitates meshing engagement in the various shift positions. If a single sleeve were to be employed, it must be disengaged from the ring gear 5 before engaging the gear casing 24 and disengaged from the gear casing 24 before engaging the ring gear 5. There would be no assurance that after moving out of a shift position and into a neutral position the single sleeve could again be engaged in either of the shift positions.

Once the single sleeve is out of engagement from all tooth systems, i.e. the ring gear, the carrier assembly rim, the spur gear 22 and the gear casing 24, it would have to be simultaneously engaged in two tooth systems, either the ring gear and the carrier assembly rim (first shift position) or the gear casing and the spur gear 22 (second shift position). Such simultaneous engagement would be practically impossible since the various gear parts have begun to move due to the drag moment of the transmission together with its torque converter or other hydraulic coupling which would be driving the ring gear, the planet gears and the sun gear.

Thus, it will be seen that there is provided a shiftable planetary gear train which achieves the various features and aspects of the present invention and is well suited to meet the conditions of practical usage.

Since various possible embodiments might be made of the present invention and further changes might be made in the exemplary embodiment set forth herein, it is to be understood that all material set forth or shown in the accompanying drawings is to be interpreted as illustrative and not in a limiting sense.

We claim:

1. A shiftable planetary gear train comprising a ring gear, a planet carrier assembly, a plurality of planet gears and a sun gear, means mounting the planet gears to the carrier assembly, the planet gears being in meshing engagement with the ring gear and the sun gear, the gear train further comprising a first sleeve, means continuously interconnecting the first sleeve and the ring gear for unitary rotation of the first sleeve relative to said ring gear and the ring gear while permitting axial displacement of the first sleeve, means for selectively interconnecting the first sleeve with the carrier assembly for unitary rotation upon axial displacement of the first sleeve to a predetermined first shift position, a second sleeve, means continuously preventing rotation of the second sleeve relative thereto while permitting axial displacement of the second sleeve, means for selectively interconnecting the second sleeve with the sun gear for preventing rotation of the sun gear upon axial displacement of the second sleeve to a predetermined second shift position, a shift element, means interconnecting the shift element for simultaneous axial displacement of both sleeves to selectively displace the sleeves axially between the first shift position wherein the first sleeve is connected to the carrier assembly for simultaneous rotation with the carrier assembly and the second sleeve is not connected to the sun gear and the second shift position wherein the second sleeve is interconnected to the sun gear through said means for selectively interconnecting the second sleeve with said sun gear for preventing rotation of the sun gear while the first sleeve is not connected to the carrier assembly.

2. A shiftable planetary gear train constructed in accordance with claim 1 wherein the means for interconnecting the shift element for simultaneous axial displacement of both sleeves includes means for positioning both sleeves to a neutral position wherein the first sleeve is not connected to the carrier assembly and the second sleeve is not connected to the spur gear.

3. A shiftable planetary gear train constructed in accordance with claim 1 wherein the sleeves are coaxial and in end-to-end juxtaposed relationship.

4. A shiftable planetary gear train constructed in accordance with claim 1 wherein the shift element comprises a shift fork and the means interconnecting the shift element to the sleeves for simultaneous axial displacement includes means forming a groove in each sleeve, the shift fork including a pair of arms, one arm being positioned within each groove.

5. A shiftable planetary gear train constructed in accordance with claim 1 wherein the carrier assembly includes an annular rim and means forming gearing along the periphery of the rim, the means selectively interconnecting the first sleeve with the carrier assembly including gearing means formed on the first sleeve, the gearing means being selectively engageable with the rim gearing.

6. A shiftable planetary gear train constructed in accordance with claim 1 wherein the means selectively interconnecting the second sleeve with the sun gear includes a spur gear and means unitarily interconnecting the spur gear to the sun gear for simultaneous rotation therewith, the second sleeve including gear means selectively engageable with the spur gear.

7. A shiftable planetary gear train constructed in accordance with claim 6 wherein the means unitarily interconnecting the spur gear with the sun gear further includes an elongate cylindrical hub.

8. A shiftable planetary gear train constructed in accordance with claim 1 wherein the carrier assembly includes a carrier plate and a rim, the rim being spaced from the carrier plate, said planet gears being positioned between said carrier plate and said rim, the means selectively interconnecting the first sleeve with the carrier assembly including means engaging the rim.

9. A shiftable planetary gear train constructed in accordance with claim 1 wherein each of the sleeves includes a peripheral spur gear and an annular gear, the means for interconnecting the first sleeve and the ring gear including the spur gear of the first sleeve, the means for preventing rotation of the second sleeve including the spur gear of the second sleeve, the means selectively interconnecting the first sleeve with the carrier assembly including the annular gear of the first sleeve and the means selectively interconnecting the second sleeve with the sun gear including the annular gear of the second sleeve.

10. A shiftable planetary gear train constructed in accordance with claim 1 wherein the width of the teeth of the ring gear are elongated for permitting axial displacement of the first sleeve.

11. A vehicle comprising an engine, an automatic transmission being driven by said engine, a shiftable planetary gear train constructed in accordance with claim 1, the shiftable planetary gear train being driven by the automatic transmission and further including an output shaft fixed to the carrier assembly, the output shaft adapted to be in driving engagement with a vehicle drive shaft which is in driving engagement with wheels.

12. A vehicle constructed in accordance with claim 11 further including gearing means interconnecting the automatic transmission and the ring gear for driving the planetary gear train.

* * * * *